Dec. 1, 1964  K. HILGERS  3,159,034
BALANCING MACHINE
Filed Nov. 24, 1961  2 Sheets-Sheet 1

INVENTOR:
Karl Hilgers
BY
Darby, Robertson & Vandenburgh,
attorneys

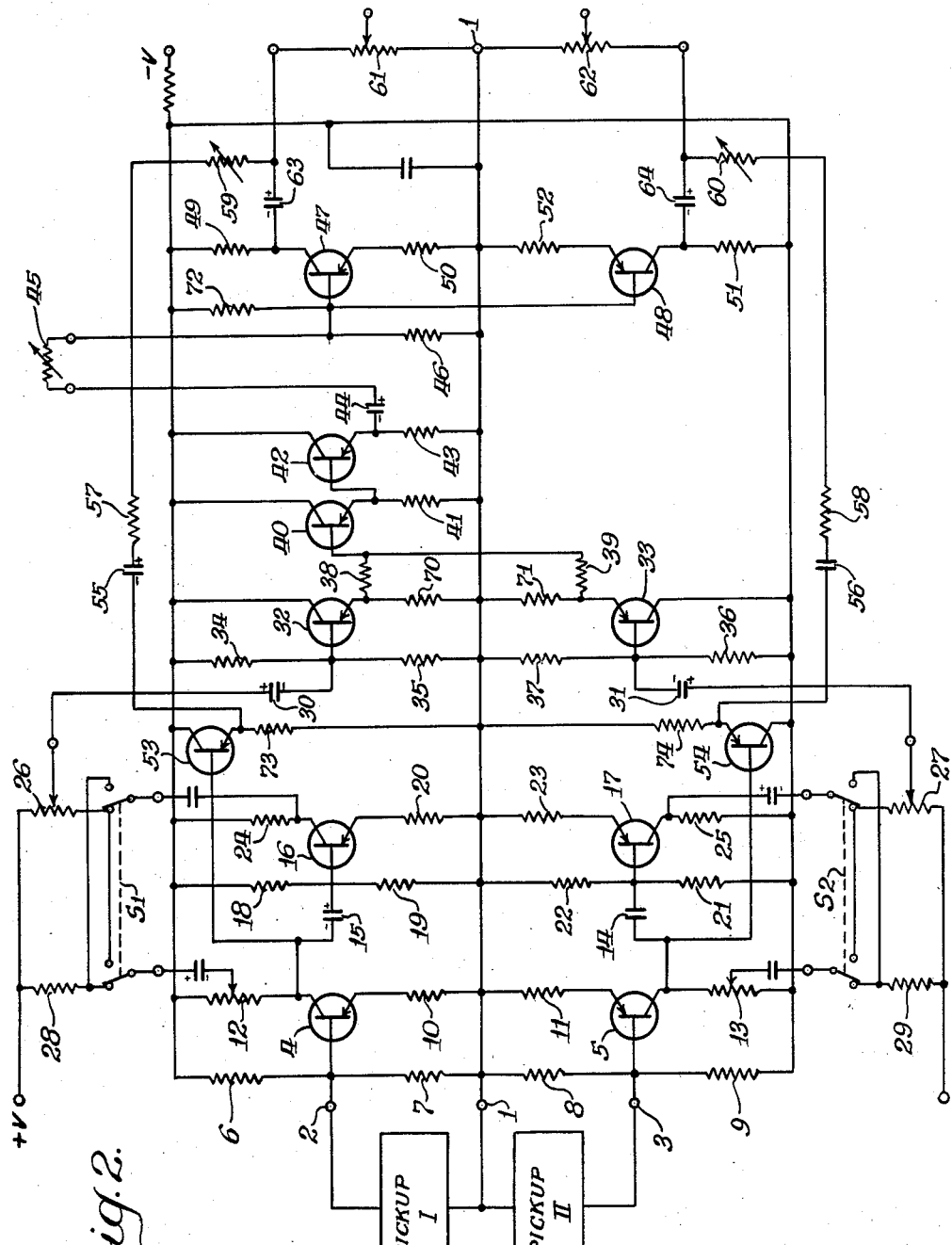

United States Patent Office 3,159,034
Patented Dec. 1, 1964

3,159,034
BALANCING MACHINE
Karl Hilgers, Dusseldorf, Germany, assignor to Losenhausenwerk, Dusseldorfer Maschinenbau A.G., Dusseldorf-Grafenberg, Germany
Filed Nov. 24, 1961, Ser. No. 154,517
Claims priority, application Germany, Nov. 25, 1960, L 37,627
10 Claims. (Cl. 73—462)

The invention relates to a balancing machine with two force-measuring pick-ups in the bearing planes. For the electric conversion of the unbalance forces, measured in the bearing planes, on the balancing plane voltage divider arrangements are known through which partial voltages are obtained from the pick-up voltages and connected in opposition to each other in a suitable manner. Since with the use of force-measuring pick-ups the bearing forces $P_I$, $P_{II}$ are measured which are related with the unbalances $P_1$, $P_2$ referred to the balancing planes by the simple equations (1) $$P_1 = P_I \frac{a+b}{b} - P_{II} \frac{c}{b}$$

(2) $$-P_2 = P_I \frac{a}{b} - P_{II} \frac{b+c}{b}$$

(compare FIG. 1), the adjustment of the voltage divider arrangement can be made by means of adjustment values mathematically determined from the distances of the bearing and balancing planes. With a known arrangement two voltage dividers to which one each of the pick-up voltages is applied, are adjusted directly according to the values $$\frac{a+b}{b} \text{ and } \frac{c}{b}$$

and the partial voltages obtained are connected in opposition to each other. Then, however, it is necessary to mathematically determine the values $$\frac{a+b}{b} \text{ and } \frac{c}{b}$$

(compare e.g. the Dutch patent specification 87,182).

In order to avoid these disadvantages an arrangement is known where for balancing the residual moments a voltage divider arrangement is provided comprising at least three voltage dividers which are adjusted proportionally to the distances between both bearing planes and the associated balancing planes. (Compare the German patent specification 962,474.) With the known arrangement the expressions $$\frac{a+b}{b} \text{ and } \frac{c}{b}$$

are copied by means of a potentiometric network the individual potentiometers of which are adjusted in accordance with $a$, $b$ and $c$ themselves. Since the distance $b$ of the two balancing planes occurs twice in the mentioned expressions, namely firstly in the numerator and secondly in the denominator, four potentiometers are provided in the known arrangement, two of which are adjusted proportionally to $b$. To this end these two potentiometers may be arranged on a common shaft so that they are being adjusted together. This, however, involves considerable expenses. Furthermore practice has shown that it offers considerable difficulties to sufficiently exactly adapt the characteristics of the "$b$" potentiometers to each other so that they are adjustable with a common adjustment.

For avoiding these disadvantages the invention, therefore, in further modification of the principle described in the patent specification 962,474 provides for partial voltages to be obtained from the two pick-up voltages by means of two of the voltage dividers and to be connected in opposition to each other, that the differential value $(U_I a - U_{II} c)$ is electrically divided by means of the third voltage divider by the value ($b$) adjusted thereat and that one of the pick-up voltages ($U_I$ and $U_{II}$) is superimposed to the quotient value $$\frac{(U_I a - U_{II} c)}{b}$$

so obtained.

The invention is based on the knowledge that the circuit is substantially simplified if a somewhat modified wording of the Equations 1 and 2 is started from, namely (3) $$P_1 = P_I + \frac{P_I a - P_{II} c}{b}$$

(4) $$P_2 = P_{II} - \frac{P_I a - P_{II} c}{b}$$

Herein the distances $a$, $b$, and $c$ each only occur once so that only one potentiometer must be provided for each of them. The two first-mentioned voltage dividers are adjusted proportionally to $a$ and $c$, the third is being adjusted in accordance with $b$. A linear division of the "$b$" potentiometer may be obtained if the differential value is applied to the third voltage divider over a resistance transducer stage, comprising a fixed resistor and a variable resistor, and the quotient value is obtained at the fixed resistor. Then, the "$b$" potentiometer is connected as variable resistor. The resistance transduction serves the purpose of making the voltage applied to the third voltage divider independent of the load, that is to say of the total resistance of the voltage divider.

The embodiment disclosed operates on the principle of algebraic computation of the unbalance forces according to Equations 3 and 4. Since in some instances the sign of one of the numerator radicals (i.e. $P_I a$ or $P_{II} c$) will change, it may simplify the understanding of the operation of the embodiment to rewrite Equations 3 and 4 as an algebraic sum of the radicals as follows:

(3) rewritten as (5) $$P_1 = P_I + \frac{R_I + R_{II}}{b}$$

(4) rewritten as (6) $$-P_2 = -P_{II} + \frac{R_I + R_{II}}{b}$$

In Equations 5 and 6 $R_I$ is a radical equaling either a positive or a negative $P_I a$ (as the case may be), and $R_{II}$ is a radical equaling either a positive or a negative $P_{II} c$ (as the case may be). For ordinary balancing wherein the rotor being balanced is between the bearings the radical $R_{II}$ is a negative figure and $R_I$ is a positive figure. In an instance of "flywheel" balancing wherein the rotor is to the right of the right hand bearing of FIGURE 1, then the radical $R_{II}$ represents a positive figure. If the rotor were to the left of the left bearing, then the radical $R_I$ would be a negative figure.

A balancing machine according to the invention may easily be so designed that it simultaneously indicates the unbalances in both balancing planes. This can easily be done in that the quotient value is simultaneously supplied to two output circuits in one of which one pick-up voltage and in the other of which the other pick-up voltage is superimposed to the value.

For "flying balancing" (negative values of $a$ or $c$) the arrangement may be so provided that the pick-up voltages, preferably after amplification by means of a transistor amplifier, are applicable over a switch optionally directly or over a phase-reversing further amplifier to the two voltage dividers.

An embodiment of the invention is presented in the drawings and described as follows:

FIG. 2 shows the circuit of a balancing machine according to the invention.

Figure 1:
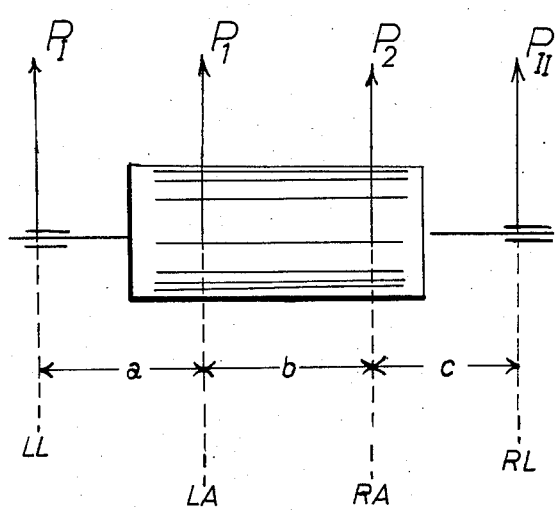
FIG. 1 shows schematically an unbalance body with the positions of the bearing and the balancing planes.

Measuring voltages $U_I$ and $U_{II}$ are developed in the known manner in the pick-ups I and II arranged in the bearing planes LL and RL (FIG. 1) by means of the forces $P_I$ and $P_{II}$. These pick-up voltages are applied to the terminals 2 and 3 respectively, with terminal 1 being the common or ground (FIG. 2). These voltages are amplified by means of transistors 4 and 5. Resistors 6 and 7, and 8 and 9 respectively serve for adjusting the operating point of the transistors 4 and 5. The resistors 10 and 11 in the usual manner serve the purpose of current limitation. Amplified pick-up voltages $U_1$ and $U_2$ appears at the resistors 12 and 13 respectively. The voltages are individually fed to second transistors 16 and 17 respectively through coupling capacitors 14 and 15 respectively. The resistors 18, 19, 20 and 24, and 21, 22, 23 and 25 in the usual manner serve for adjusting the operating points of the transistors 14 and 15 respectively and for current limitation purposes. The amplified pick-up voltages then appear at the resistors 24 and 25 respectively. The voltages obtained there are however 180° out-of-phase relatively to the voltages as seen at the resistors 12 and 13, and are in phase with the voltages at terminals 2 and 3. As is well-known, a transistor similarly to an electron tube, reverses the phase about 180°. Therefore, voltages are applied to the resistors 12, 13, and 24, 25 respectively, which both times correspond to the pick-up voltages $U_I$ and $U_{II}$, however 180° out-of-phase relatively to each other. $S_1$ and $S_2$ designate two double-throw switches. By means of these the voltages obtained at the resistors 12 and 13 or at the resistors 24 and 25 are applied to potentiometers 26 and 27 respectively. In order that the load of the transistor not connected to the potentiometers 26 or 27 respectively does not change, a corresponding fixed resistor each 28 or 29 respectively is connected by means of the switches $S_1$ and $S_2$.

The potentiometers 26 and 27 are adjusted proportionally to $a$ (FIG. 1) and $c$. The currents obtained $aU_I$ and $\Omega cU_{II}$ are applied to the bases of the transistors 32 and 33 through coupling capacitors 30 and 31. The resistors 34, 35, and 36 and 37 respectively again serve for adjusting the operating point of the transistor.

The output currents of the transistors 32 and 33 develop a voltage at load resistors 70 and 71, respectively. The voltages developed across load resistors 70 and 71 are superimposed over decoupling resistors 38 and 39, added and applied to the base of a transistor 40.

The transistors 32 and 33 are connected as resistance transducers, similarly to a cathode follower circuit of an electron tube. Therefore, they do not amplify the voltages. Transistor 40, too, is connected as resistance transducer. Its load resistor is designated with 41. The output voltage of the transistor stage 40, appearing at resistor 41, is applied to a second transistor stage 42, also connected as resistance transducer. The output voltage at transistor 42 appears at load resistor 43 and is applied to a voltage divider through a coupling capacitor 44. The voltage divider comprises a potentiometer 45 connected as variable resistor and a fixed resistor 46. The output voltage of stage 42, 43 is so low-resistant through the repeated resistance transduction that it does not change with a change in the load. It is proportional to $R_I + R_{II}$ or $U_{I}a - U_{II}c$. The potentiometer 45 plus fixed resistor 46 is adjusted proportionally to $b$. It is apparent that $b$ cannot fall below a certain value. If then the partial voltage of the voltage divider is obtained at the fixed resistor 46, it consequently is $$\frac{R_{46}}{b}$$

the resistance of resistor 46 divided by $b$. The circuit consequently executes an electric division by $b$. A value is obtained $$\frac{R_I + R_{II}}{b} \text{ or } \frac{U_Ia - U_{II}c}{b}$$

This voltage is simultaneously fed to two transistors 47 and 48. Reference numerals 49, 50 and 51, 52 respectively designate the customary load resistors of the transistors 47 and 48. Resistor 72 adjusts the operating point of transistors 47 and 48.

The voltages obtained at the resistors 12 and 13 respectively are simultaneously applied to the transistors 53 and 54 respectively apart from the transistor 16, 17. Transistors 53 and 54 have load resistors 73 and 74 respectively. The output currents of these transistors 53 and 54, appearing as voltage signals at the load resistors 73 and 74 and which are proportional to the full pick-up voltages $U_I$ and $U_{II}$, are fed to potentiometers 61 and 62 over coupling capacitors 55 and 56, resistors 57 and 58 and variable resistors 59 and 60. Also fed to potentiometers 61 and 62 are the output voltages developed by transistors 47 and 48, which are applied through capacitors 63 and 64. The balancing radii are adjusted at the potentiometers 61 and 62. Voltages are obtainable at them, which are proportional to $$U_I + \frac{U_Ia - U_{II}c}{b}$$

respectively $$-U_{II} + \frac{U_Ia - U_{II}c}{b}$$

which therefore represent measured values for the unbalances in both balancing planes. These two measured values may be simultaneously indicated with a circuit of the invention or used otherwise.

By means of switches $S_1$ and $S_2$ the phase of the voltage applied to the potentiometers 26 and 27 respectively may be changed. This corresponds to an algebraic sign reversal of the distances $a$ or $c$ as may occur with "flying balancing," that is to say in case of a balancing where one or both balancing planes are outside the bearing planes.

The indicated circuit may also in an equivalent manner be performed with tubes. Barium-titanate elements, for instance, may be used as pick-up. The bearing forces may, however be determined in any other suitable manner, e.g. by magnetostrictive measuring.

Operation

In the use of the invention with normal balancing, i.e. where the rotor is positioned between the bearings as in FIGURE 1, the two pickup voltages are applied at terminals 2 and 3. These voltages are applied 180° out of phase. As an illustation, it will be assumed that a $-U_I$ is applied at terminal 2 while a $+U_{II}$ is applied at terminal 3. With the phase reversal across transistors 4 and 5, the signal appearing at load resistors 12 and 13 will be $+U_I$ and $-U_{II}$ respectively. At load resistors 24 and 25 of transistors 16 and 17, the signals will be $-U_1$ and $+U_{II}$ respectively.

In this illustration, switches $S_I$ and $S_{II}$ are positioned as illustrated in FIGURE 2. Thus the signals applied to transistors 32 and 33 will be those derived at transistors 16 and 17, multiplied by $a$ and $c$ respectively by reason of the position of the contact arms on potentiometers 26 and 27. The signal at transistor 32 will be $R_I$ or $-U_Ia$. At transistor 33, the applied signal will be $R_{II}$ or $+U_{II}c$. Since transistors 32 and 33 are connected in the manner of cathode followers, the output signal will have the same phase as that of the input signal. The two output signals of transistors 32 and 33 are added ($R_I + R_{II}$) after passing through decoupling resistors 38 and 39. Therefore the signal at the base of transistor 40 is $R_I + R_{II}$ or $-(U_Ia - U_{II}c)$. Again there is no phase reversal through transistors 40 and 42 so that after the division by $b$ occurring in the circuit of resistors 45 and 46, the signal applied to the bases of transistors 47 and 48 is $$-\frac{R_\text{I}+R_\text{II}}{b} \text{ or } -\frac{U_\text{I}a-U_\text{II}c}{b}$$

After the phase reversal of transistors 47 and 48, the signal applied across potentiometers 61 and 62 is $$+\frac{R_\text{I}+R_\text{II}}{b} \text{ or } +\frac{U_\text{I}a-U_\text{II}c}{b}$$

At the time, as previously mentioned, the original two signals are simultaneously applied across potentiometers 61 and 62 from the output of transistors 53 and 54 respectively. Since the input to transistor 53 was $+U_\text{I}$ and there is no phase reversal across transistor 53, the output signal to potentiometer 61 is $+U_\text{I}$. Similarly the input signal of transistor 54 is $-U_\text{II}$ and the same signal is applied across potentiometer 62. Thus the composite signal appearing at potentiometer 61 is $$U_\text{I}+\frac{R_\text{I}+R_\text{II}}{b} \text{ or } +U_\text{I}+\frac{U_\text{I}a-U_\text{II}c}{b}$$

At potentiometer 62, the composite signal is $$-U_\text{II}+\frac{R_\text{I}+R_\text{II}}{b} \text{ or } -U_\text{II}+\frac{U_\text{I}a-U_\text{II}c}{b}$$

It will be seen that these correspond to Equations 5 and 6.

In flywheel type balancing the rotor is positioned outboard one or the other of the two bearings rather than between the two bearings as illustrated in FIGURE 1. Depending upon which bearing the rotor is adjacent to (but outboard of), $a$ or $c$ becomes a negative figure. For example, with respect to FIGURE 1, if it is assumed that the rotor is to the right of the bearing plane RL, $c$ is negative. Thus $R_\text{II}$ should be algebraically added to $R_\text{I}$ as a radical of the opposite sign than was the radical added to $R_\text{I}$ in the foregoing illustration of normal balancing. To achieve this, switch $S_2$ is changed in position so that the signal applied to the base of transistor 33 is derived directly from load 13 of transistor 5 without passing through transistor 17. This signal of course is multiplied by $c$ in potentiometer 27 as previously described. Thus as the signal appears at the base of transistor 33, the sign of the radical $R_\text{II}$ is 180° out of phase with the sign of the radical $R_\text{II}$ appearing at the same point in the instance of normal balancing. Therefore when the two radicals $R_\text{I}$ and $R_\text{II}$ are added and applied to the base of transistor 40, this sign reversal of radical $R_\text{II}$ is maintained and similarly appears at the output (potentiometers 61 and 62).

The invention is claimed as follows:

1. In an apparatus for measuring the unbalance of a revolving body wherein a pickup at one bearing produces an electrical signal representing the force at said bearing proportional to the unbalance forces at the bearing and a second pickup at a second bearing produces a second electrical signal representing the force at the second bearing proportional to the unbalance forces at the second bearing, and wherein $a$ represents the distance from the one bearing to the first balancing plane of the body, $c$ represents the distance from the second bearing to the second balancing plane of the body and $b$ represents the distance between the balance planes, the improvement comprising: electrical means connected to said pickups to produce a third signal approximately proportional to the algebraic sum of the first signal multiplied by the distance $a$ and the second signal multiplied by the distance $c$, using said third signal to produce a fourth signal approximately proportional to the quotient of said third signal divided by the distance $b$, and using said fourth signal and one of the first two signalts to produce a fifth signal consisting of the algebraic sum of said one of the first two signals and said fourth signal.

2. In an apparatus for measuring the unbalance of a revolving body wherein a pickup at one bearing produces an electrical signal representing the force at said bearing proportional to the unbalance forces at the bearing and a second pickup at a second bearing produces a second electrical signal representing the force at the second bearing proportional to the unbalance forces at the second bearing, and wherein $a$ represents the distance from the one bearing to the first balancing plane of the body, $c$ represents the distance from the second bearing to the second balancing plane of the body and $b$ represents the distance between the balancing planes, the improvement comprising: electrical means connected to said pickups to produce a third signal approximately proportional to the algebraic sum of the first signal multiplied by the distance $a$ and the second signal multiplied by the distance $c$, using said third signal to produce a fourth signal approximately proportional to the quotient of said third signal divided by the distance $b$, using said fourth signal and one of the first two signals to produce a fifth signal consisting of the algebraic sum of said one of the first two signals and said fourth signal, and using said fourth signal and the other of said first two signals to produce a sixth signal consisting of the algebraic sum of said other of the first two signals and said fourth signal.

3. In an apparatus as set forth in claim 2, wherein said electrical means includes two output transistor amplifiers each having an input and an output, the input of each amplifier being connected to receive said fourth electrical signal, each amplifier having an independent resistor in the output circuit thereof across which the output of the respective amplifier is applied, said electrical means also being connected to apply the first electrical signal across one of said resistors and to apply the second electrical signal across the other of said resistors.

4. In an apparatus as set forth in claim 3, wherein said resistors each comprise a potentiometer which is variable in accordance with the balancing radius.

5. In an apparatus as set forth in claim 2, wherein: said electrical means comprises a first device including a two channel amplifier with an input and an output for each channel and with signal paths therebetween, the input of one channel being connected to receive the signal from one pickup, the input of the other channel being connected to receive the signal from the second pickup, and variable impedances in each channel in the signal path thereof to provide said multiplication by $a$ and $c$ respectively, the outputs of the two channels being connected together to produce said third signal; a second device having an input and an output with a signal path therebetween, said input of said second device being connected to the first device to receive said third signal, said second device including a variable impedance in said signal path to divide said third signal by $b$ to produce said fourth signal; and a third device with two channels, each with two inputs and an output, one of said two inputs of each channel being connected to the output of said second device to receive said fourth signal, the other of the two inputs of one channel of the third device being connected to one channel of the first device to receive said first signal, the other of the two inputs of the other channel of the third device being connected to the other channel of the first device to receive said second signal.

6. In an apparatus as set forth in claim 5, wherein each channel of said first device includes at least two stages, and switch means in the signal path of the respective channel and interconnecting said stages and operable to reverse the phase of the signal at the output of said channel.

7. In an apparatus as set forth in claim 6, wherein said second device comprises resistance transducer means having an output, a variable impedance and a fixed impedance connected together and connected across said output of the transducer means, the connection between said fixed and variable impedances being said output of said second device.

8. In an apparatus for measuring the unbalance of a revolving body wherein a pickup at one bearing produces an electrical signal representing the force at said bearing proportional to the unbalance forces at the bearing and a second pickup at a second bearing produces a second electrical signal representing the force at the second bearing proportional to the unbalance forces at the second bearing, and wherein $a$ represents the distance from the one bearing to the first balancing plane of the body, $c$ represents the distance from the second bearing to the second balancing plane of the body and $b$ represents the distance between the balancing planes, the improvement comprising: a first electrical means connected to said pickups to produce a third signal approximately proportional to the algebraic sum of the first signal multiplied by the distance $a$ and the second signal multiplied by the distance $c$; a second electrical means connected to said first electrical means and using said third signal to produce a fourth signal approximately proportional to the quotient of said third signal divided by the distance $b$, said second electrical means including a voltage divider comprising a fixed resistor and a variable resistor connected in series, said third signal being applied across said voltage divider at a voltage that does not vary with the setting of the variable resistor, the total resistance of the voltage divider being set at a point in relation to the dimension $b$, and said fourth signal being derived at the connection between the two resistors; and a third electrical means using said fourth signal and one of the first two signals to produce a fifth signal consisting of the algebraic sum of said one of the first two signals and said fourth signal and using said fourth signal and the other of said first two signals to produce a sixth signal consisting of the algebraic sum of said other of the first two signals and said fourth signal.

9. In an apparatus as set forth in claim 8, wherein the first electrical means includes a two channel amplifier, one channel for the first signal and one channel for the second signal, said amplifier having two points in one channel at one of which the first signal appears 180° out of phase with the first signal at the other point, a switch connected to said two points and to the second electrical means to alternatively connect the second electrical means to one or the other of said points, said amplifier having two points in the other channel at a first of which the second signal appears 180° out of phase with the second signal at the second point, and a switch connected to said first and second points and to the second electrical means to alternatively connect the second electrical means to the first or second point.

10. In an apparatus as set forth in claim 9, wherein each amplifier has a decoupling resistor in the output thereof and the second electrical means includes a resistance transducer stage having an input connected to said decoupling resistors, said stage having an output connected to the voltage divider.

References Cited in the file of this patent

UNITED STATES PATENTS

| | | |
|---|---|---|
| 2,730,899 | Hellar et al. | Jan. 17, 1956 |
| 2,731,834 | Fehr et al. | Jan. 24, 1956 |
| 2,815,666 | Pischel | Dec. 10, 1957 |
| 2,962,899 | Weisse et al. | Dec. 6, 1960 |
| 2,980,331 | Gruber et al. | Apr. 18, 1961 |

FOREIGN PATENTS

| | | |
|---|---|---|
| 878,637 | Great Britain | Oct. 4, 1961 |